Oct. 3, 1967   M. M. CRUZ, JR   3,345,357
METHOD OF PURIFYING CELLULOSE CRYSTALLITE AGGREGATES
Filed Feb. 6, 1964
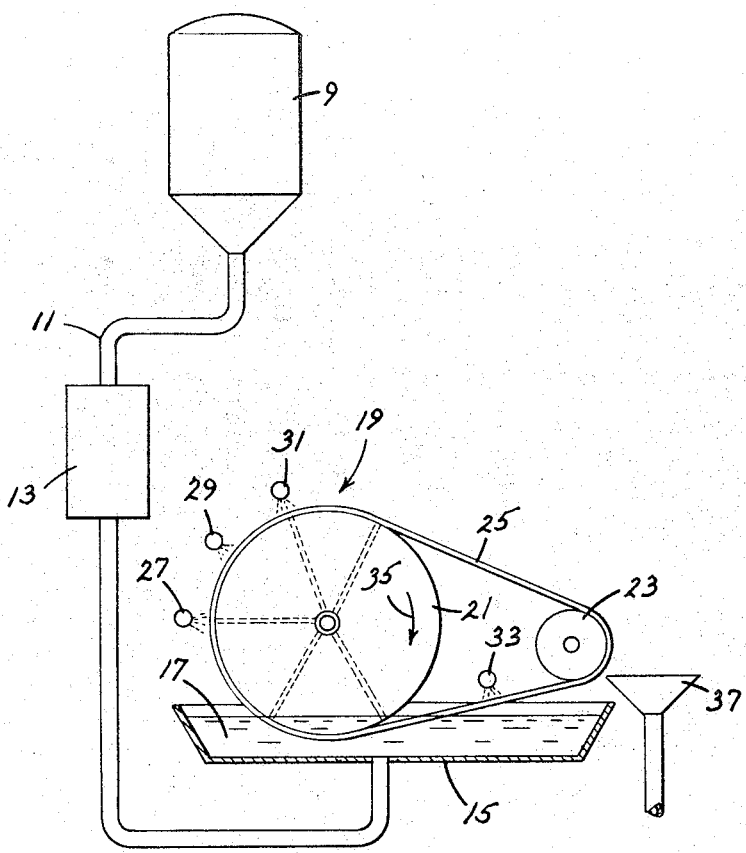

United States Patent Office 3,345,357
Patented Oct. 3, 1967

3,345,357
METHOD OF PURIFYING CELLULOSE CRYSTALLITE AGGREGATES
Mamerto M. Cruz, Jr., Newton Square, Pa., assignor to FMC Corporation, Philadelphia, Pa., a corporation of Delaware
Filed Feb. 6, 1964, Ser. No. 343,011
7 Claims. (Cl. 260—212)

ABSTRACT OF THE DISCLOSURE

Method of purifying cellulose crystallite aggregates, which have been formed by the controlled acid hydrolysis of cellulose, which involves removing free liquids from the acid hydrolysis reaction mixture to provide a cake of aggregates, followed by washing such cake with water containing a neutralizing constituent to bring the same to an approximately neutral pH, and finally washing the cake of aggregates with water.

---

This invention relates to the manufacture of crystallites of level-off D.P. cellulose, and more particularly to a method of purifying or separating cellulose crystallite aggregates from other products.

As described in U.S. Patent 2,978,446 to O. A. Battista et al., crystallites of level-off D.P. cellulose or cellulose crystallite aggregates are acid-insoluble products obtained from the controlled hydrolysis of cellulose. Any form of purified cellulose, either native or regenerated, may be reduced to level-off D.P. products by hydrolysis. Purified forms of native cellulose include such materials as cotton fibers, cotton linters, purified wood pulp and the like while specific examples of regenerated cellulose include viscose rayon fibers and filaments and non-fibrous sheet forms such as cellophane. The regenerated cellulose raw materials may be viscose rayon waste or scrap and waste or scrap cellophane with or without the numerous types of coatings conventionally applied to filaments, yarns and cellophane.

The term "level-off D.P." has reference to the average level-off degree of polymerization of the cellulose product or cellulose crystallite aggregates measured in accordance with the paper by O. A. Battista entitled "Hydrolysis and Crystallization of Cellulose," Vol. 42, Industrial and Engineering Chemistry, pages 502–7 (1950).

Although the purified cellulose may be hydrolyzed by various means, such as hydrochloric acid and ferric chloride, sulfuric acid and the like, it is preferred to employ hydrochloric acid because a pure hydrocellulose product is thus obtained. It is also known that the hydrolysis may be either drastic or mild. The drastic hydrolysis may be effected by subjecting the cellulose to a 2.5 normal solution of hydrochloric acid at the boiling point of the solution (about 105° C.) for 15 minutes. While this procedure is generally preferred, mild hydrolysis for an extended time will result in crystalline aggregates having the same characteristics.

The cellulose undergoing the hydrolysis reaches, within the time period noted, a substantially constant molecular weight, or in other words, the number of repeating units or monomers, sometimes designated anhydroglucose units, which make up the cellulosic material, becomes relatively constant, from which it is apparent that the degree of polymerization of the material has leveled off, hence the name level-off D.P. cellulose. In other words, if the hydrolysis reaction were continued beyond the period noted, the D.P. would change very little if at all. In all cases the level-off D.P. value reflects the fact that destruction of the fibrous structure has occurred as a result of the substantially complete removal of the amorphous regions of the original cellulose.

In general, the hydrolysis reaction provides a yield of about 85% to 92% of aggregates regardless of whether drastic or mild hydrolysis conditions have been employed. However, these aggregates must be separated from the hydrolysis reaction mixture or slurry which includes excess hydrolyzing acid, dissolved portions of the raw cellulosic material, various inorganic impurities, and water. Generally, the reaction slurry is diluted with ordinary tap water, after which the aggregates are separated therefrom using a known rotary vacuum filter.

In accordance with conventional purifying procedures, a cake of aggregates is first formed on an endless belt of the rotary vacuum filter in a forming zone by removing the free liquids from the reaction slurry. This cake is then washed with ordinary tap water, a dilute solution of ammonium hydroxide (about 1% $NH_4OH$ by volume) to neutralize any traces of acid, and finally with deionized water. The cellulose crystallite aggregates which are obtained by this procedure, as applied to a conventional dissolving pulp, have an average level-off D.P. of 210 to 225, and are of desired purity. With these conventional purifying procedures, however, the rate at which the aggregates are recovered is extremely slow and thus costly. Accordingly, a primary object of this invention is to provide a generally new and improved and more satisfactory method for purifying cellulose crystallite aggregates.

Another object is to provide an improved method for purifying cellulose crystallite aggregates without any sacrifice in the purity or yield of the aggregates.

Still another object of this invention is the provision of a method of recovering cellulose crystallite aggregates from a hydrolysis reaction mixture at a more rapid rate than was heretofore possible.

Other objects and advantages will be apparent from the following description and claims.

The method of the present invention is based upon the discovery that in the conventional purifying procedures, the aggregates and particularly the fine aggregates of a cake of cellulose crystallite aggregates, are readily hydrated and thus swell and assume colloidal properties. The aggregate swelling reduces the interstices between the aggregates and thus lowers the porosity of the cake. Further, in view of the hydrated condition of these colloidal particles, the impurities tend to attach themselves more firmly to the aggregates. As a result of both of these conditions, with conventional equipment aggregates of desired purity can be produced, if at all, only with difficulty and by purifying the aggregates slowly and as a very thin layer or cake.

The above disadvantages are eliminated or minimized in the method of the present invention by careful control of the pH of the cake of aggregates during the purification thereof. In the case of an acid cake, this result may be achieved by slowly and continuously filtering a very dilute ammonium hydroxide solution through the cake of aggregates. Alternatively, a solution of a weak base and a weak acid, such as, for example, ammonium acetate, may be substituted for the ammonium hydroxide solution. Using a rotary vacuum filter, as mentioned above, this controlled neutralization of the cake of aggregates can be best achieved by subjecting the same to at least two separate washes with the appropriate solutions.

Referring to the treatment of an acid cake, during the first of such ammonium hydroxide or ammonium acetate washes the pH of the cake of aggregates is raised to not more than about 4.0, and preferably to between 2.0 and 4.0. The major portion of the alkaline earth contaminants, primarily calcium and magnesium which are contained in the tap water used in the hydrolysis reaction and in diluting the hydrolysis slurry, are removed at this stage. The salts which result from this partial neutralization of the hydrolyzing acid and the excess acid which remain together serve to maintain the cake porosity and prevent or minimize the tendency for the aggregates to hydrate. Upon completion of the last ammonium hydroxide or ammonium acetate wash the pH of the cake of aggregates is raised to at least slightly more than 5.0 and may range up to about 8.0. The ammonium chloride which is produced by neutralizing the remaining hydrolyzing acid and the acetic acid which is formed when ammonium acetate is used, along with whatever slight excess ammonium hydroxide or ammonium acetate is provided, together control the cake porosity and minimize the developement of hydrated particles or colloidal gels.

Since the major impurities which affect the colloidal properties of the final product are alkali and alkaline earth salts, the wash solutions are preferably prepared with deionized water.

The resulting cake of aggregates is then washed with deionized water which generally has a pH of from 5.5 to 6.5 and which is preferably heated to increased the solubility of the contained ammonium chloride. The pH of the cake of aggregates at this stage will determine the efficiency with which the aggregates are dried after the washing stage. For example, an excess of ammonium hydroxide will induce swelling of the aggregates and will require a longer drying period to provide a product of desired solids content. It is therefore preferred that the cake of aggregates have a pH which is neutral or slightly on the acid side as it enters the final liquid extraction and drying stages.

Drying of the cake of aggregates, if drying is desired, may be effected directly by a conventional flash drying procedure. Alternatively, the cake of aggregates may be diluted with deionized water to a slurry containing about 10% to 20% solids and then spray dried. Based upon a conventional dissolving pulp as a starting material, the cellulose crystallite aggregates which are recovered by the method of the present invention have an average level-off D.P. of from 190 to 220.

Of particular importance in the method of the present invention is that the acid conditon of the cake of aggregates is rigidly controlled during the purification thereof, and that the aggregates have approximately a neutral pH when the purification is complete. Neutralization which is effected too rapidly causes the aggregates to hydrate and assume colloidal properties particularly at the surface of the cake before any substantial portion of impurities are removed therefrom. On the other hand, the presence of excessive neutralizing medium during the final washing of the aggregates with water would hydrate and swell the aggregates and thus retain the salts within the cake. This result would, in turn, necessitate more drastic and/or longer washing and dewatering cycles.

For a more detailed description, reference is made to the accompanying drawing which diagrammatically illustrates the various steps involved in the method of the present invention.

A purified cellulose material, as for example a highly purified wood pulp, may be hydrolyzed in a reactor 9 under conditions as set forth in the above-noted patent to O. A. Battista et al. The resulting hot reaction mixture or slurry is passed through a line 11 to a diluting tank 13 where it is mixed with about an equal amount of tap water. This diluted slurry then passes to a slurry trough 15 where it is denoted by the character 17. The solids content of the mixture discharged from the reaction 9 is about 7% to 10% and is subsequently reduced to about 4% to 5% in the dilution tank 13 and to about 2% to 4% in the trough 15.

Purification of the cellulose crystallite aggregates is preferably carried out on a continuous basis using a conventional rotatary vacuum filter 19, which includes a driven vacuum drum 21, a smaller discharge roller 23 and an endless filter belt 25. Spray units 27, 29 and 31 are provided for delivering wash mediums onto the aggregates, while a spray unit 33 serves to back wash the belt 25 to prevent clogging of the same.

As the drum 19 is rotated in the direction as indicated by the arrow 35, a cake of aggregates is formed on that portion of the filter belt 25 which is traveling through the slurry 17 contained in the trough 15. During this cake forming stage, a vacuum of about 5 to 7 inches of mercury is applied to the slurry in the forming zone after which the cake is subjected to a vacuum of from 15 to 20 inches of mercury to thereby remove a large portion of the free liquids therefrom. A dilute ammonium hydroxide wash, at room temperature, is delivered onto the cake of aggregates as it travels beneath the spray unit 27 to thereby raise the pH thereof to between 2.0 to 4.0, and preferably to about 3.5. The cake of aggregates is subjected to a vacuum as it travels beyond the spray unit 27 to remove free liquids and thereby carry away from the cake the major portion of the alkaline earth contaminants.

As the cake of aggregates now travels beneath the spray unit 29, it is again washed with ammonium hydroxide at room temperature to complete the neutralization of the excess hydrolyzing acid and thus raise the pH thereof to between 5.0 to 8.0 and preferably to about 7.0. The free liquid is removed from the cake of aggregates as it travels toward the spray unit 31 where it is washed with deionized water having a pH of about 6.0 and which is heated to about 70° to 150° F., preferably 140° F., to increase the solubility of the contained salts. During the remainder of the travel of the belt 25 along the drum 21, the wash water is extracted from the cake. As the belt 25 travels over the discharge roller 23, the cake of aggregates fall into a hopper 37 for further processing, as for example flash or spray drying.

The invention may be illustrated by the following example:

*Example 1*

Cellulose crystallite aggregates were prepared by hydrolyzing Ketchakan sulfite pulp with a 0.7% HCl for about 2 hours at 260° to 265° F. A slurry obtained from this hydrolysis reaction was diluted with an equal volume of ordinary tap water which also reduced its temperature to about 130° F.

Using a rotary vacuum filter, as described above, a cake of cellulose crystallite aggregates was formed on the surface of the filter belt under a vacuum of from 5 to 7 inches of mercury. As this formed cake left the trough 15, it was subjected to a vacuum of from 15 to 20 inches of mercury and then washed with hot tap water, followed by a 1% $NH_4OH$ solution at room temperature, and finally with deionized water heated to 140° F. The resulting aggregates were spray dried and had an average level-off D.P. of about 215. During this conventional purifying procedure cellulose crystallite aggregates were produced at a rate of 500 pounds per hour, based on the dry weight of the product.

For purposes of comparison a hydrolysis reaction slurry was prepared and diluted as described above and purified in accordance with the method of the present invention. A cake of aggregates was formed on the filter belt and washed with a solution $NH_4OH$ to raise the pH of the aggregates to about 3.5. This was followed by a second wash with $NH_4OH$ to raise the pH of the aggregates to about 7.0 and finally by a wash with deionized water having a pH of about 5.5–6.5 and being heated to 140° F. The excess liquid was removed from the cake and the cake at this stage contained about 38%–42% solids. The aggregates were spray dried in the conventional manner and had an average level-off D.P. of about 200. While the resulting cellulose crystallite aggregates were of the same purity as those produced by the conventional procedure described above with the method of the present invention production was effected at the rate of 1250 pounds per hour, based upon the weight of the dried aggregates.

Example II

A slurry of cellulose crystallite aggregates was prepared and diluted as described in Example I after which a cake of aggregates was formed on the belt of the filtering apparatus. The cake was treated with one $NH_4OH$ wash, to rapidly bring the pH of the aggregates to 7.0, and then washed with deionized water having a pH of 6.5 and a temperature of 140° F. The aggregates were then spray dried and had an average level-off D.P. of 200. In view of the rapid neutralization and the tendency for the aggregates to assume colloidal properties, it was found that aggregates having the same purity as those provided by the method of the present invention could be formed only by drastically reducing the rate of filtration to that employed in the conventional purifying procedures described above.

It is to be understood that changes and variations may be made without departing from the spirit and scope of the invention as defined in the appended claims. For example after the final neutralization treatment and before the final wash, the cellulose crystallite aggregate cake may be subjected to neutral peroxide bleach solution.

I claim:

1. A method of purifying cellulose crystallite aggregates which have been formed by the controlled acid hydrolysis of cellulose comprising the steps of removing free liquids from the acid hydrolysis reaction mixture to provide a cake of aggregates washing the cake of aggregates with water containing a neutralizing constituent selected from the group consisting of ammonium hydroxide and ammonium acetate to gradually bring the cake of aggregates to an approximately neutral pH condition while simultaneously removing impurities therefrom and thereafter washing the cake of aggregates with water.

2. A method of purifying cellulose crystallite aggregates which have been formed by the controlled acid hydrolysis of cellulose comprising the step of removing free liquids from the acid hydrolysis reaction mixture to provide a cake of aggregates, washing the cake of aggregates with a solution having a neutralizing constituent selected from the group consisting of ammonium hydroxide and ammonium acetate to gradually neutralize the excess hydrolyzing acid and bring the same to a pH condition of not more than about 8.0 while removing impurities therefrom, and washing the cake of aggregates with deionized water to remove the salts formed upon the neutralization of the excess hydrolyzing acid.

3. A method of purifying cellulose crystallite aggregates which have been formed by controlled acid hydrolysis of cellulose comprising the steps of removing free liquids from the acid hydrolysis reaction mixture to provide a cake of aggregates, washing the cake of aggregates with a solution having a neutralizing constituent selected from the group of ammonium hydroxide and ammonium acetate to partially neutralize the same, subjecting the cake of aggregates to at least a second wash with the neutralizing solution to bring the pH thereof to approximately a neutral condition, and washing the cake of aggregates with deionized water.

4. A method of purifying cellulose crystallite aggregates which have been formed by controlled acid hydrolysis of cellulose comprising the steps of removing free liquids from the acid hydrolysis reaction mixture to provide a cake of aggregates, washing the cake of aggregates with a solution having a neutralizing constituent selected from the group consisting of ammonium hydroxide and ammonium acetate to bring the pH thereof to at least 2.0 removing free liquids from the cake of aggregates, subjecting the cake of aggregates to at least the second wash with the neutralizing solution to bring the pH thereof to at least 5.0, removing free liquids from the cake of aggregates and washing the cake of aggregates with deionized water.

5. A method as defined in claim 4 wherein the pH of the aggregates is between 2.0 and 4.0 after their first washing thereof.

6. A method as defined in claim 4 wherein the pH of the aggregates is between 5.0 and 8.0 prior to washing thereof with deionized water.

7. A method as defined in claim 5 wherein the neutralized cake of aggregates is washed with hot deionized water, said aggregates having a pH of 5.5 to 6.5 after the washing thereof.

References Cited

UNITED STATES PATENTS

| | | | |
|---|---|---|---|
| 2,978,446 | 4/1961 | Battista et al. | 260—212 |
| 3,141,875 | 7/1964 | Battista et al. | 260—212 |

DONALD E. CZAJA, *Primary Examiner.*

R. W. MULCAHY, *Assistant Examiner.*